United States Patent
Refstrup

(10) Patent No.: US 9,875,365 B2
(45) Date of Patent: Jan. 23, 2018

(54) PROVIDING AUTHENTICATED COMMUNICATIONS TO A REPLACEABLE PRINTER COMPONENT

(75) Inventor: Jacob Grundtvig Refstrup, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1038 days.

(21) Appl. No.: 12/994,979

(22) PCT Filed: May 29, 2008

(86) PCT No.: PCT/US2008/065103
§ 371 (c)(1),
(2), (4) Date: Nov. 29, 2010

(87) PCT Pub. No.: WO2009/145773
PCT Pub. Date: Dec. 3, 2009

(65) Prior Publication Data
US 2011/0075189 A1 Mar. 31, 2011

(51) Int. Cl.
G06K 15/00 (2006.01)
G06F 21/60 (2013.01)

(52) U.S. Cl.
CPC ................... *G06F 21/608* (2013.01)

(58) Field of Classification Search
CPC .. G06F 21/608; G06F 21/445; B41J 2/17546; G03G 15/0863; H04L 9/0819; H04L 9/3242; H04N 1/00538; H04N 1/32101
USPC ................. 358/1.14, 1.15; 713/171; 714/718
See application file for complete search history.

(56) References Cited

U.S. PATENT DOCUMENTS

| 4,961,088 A | 10/1990 | Gilliland et al. |
| 5,610,635 A | 3/1997 | Murray et al. |
| 5,699,091 A | 12/1997 | Bullock et al. |
| 5,812,156 A | 9/1998 | Bullock et al. |
| 5,835,817 A | 11/1998 | Bullock et al. |
| 6,019,461 A | 2/2000 | Yoshimura et al. |
| 6,039,430 A | 3/2000 | Helterline et al. |
| 6,126,265 A | 10/2000 | Childers et al. |

(Continued)

FOREIGN PATENT DOCUMENTS

| CN | 1996837 A | 7/2007 |
| EP | 2286346 A1 | 2/2011 |

(Continued)

OTHER PUBLICATIONS

EP Supplementary Search Report for EP Patent Application No. 08756444.9, European Patent Office, Mar. 28, 2012.

*Primary Examiner* — Neil R McLean
(74) *Attorney, Agent, or Firm* — Fabian VanCott

(57) ABSTRACT

A replaceable printer component includes a first memory device and a communication link. The first memory device stores a first secret. The communication link is configured to communicatively link the first memory device to a printer controller when the replaceable printer component is installed in a printing system. The printing system includes a second memory device storing a second secret. The second memory device is communicatively linked to the printer controller. The first memory device is configured to authenticate communications between the first memory device and the printer controller based on the first secret and the second secret.

12 Claims, 3 Drawing Sheets

(56) References Cited

U.S. PATENT DOCUMENTS

| | | |
|---|---|---|
| 6,459,860 B1 | 10/2002 | Childers |
| 6,690,289 B1* | 2/2004 | Odinak ............... H04L 9/085 340/4.41 |
| 6,738,903 B1 | 5/2004 | Haines |
| 6,799,273 B1* | 9/2004 | Oishi et al. ............... 713/171 |
| 6,817,693 B2 | 11/2004 | Phillips et al. |
| 7,137,000 B2 | 11/2006 | Hohberger et al. |
| 7,246,098 B1* | 7/2007 | Walmsley ............... 705/64 |
| 7,248,693 B1 | 7/2007 | Tretter et al. |
| 7,286,774 B1 | 10/2007 | Miller et al. |
| 7,293,292 B2 | 11/2007 | Testardi et al. |
| 7,327,846 B1* | 2/2008 | Chang ............... H04L 9/0841 380/259 |
| 7,353,395 B2 | 4/2008 | Gentry |
| 7,356,279 B2 | 4/2008 | Miller |
| 7,370,111 B2 | 5/2008 | Callum |
| 2007/0160204 A1* | 7/2007 | Kimura et al. ............. 380/46 |
| 2007/0188776 A1 | 8/2007 | Lapstun et al. |
| 2007/0211291 A1 | 9/2007 | Walmsley |

FOREIGN PATENT DOCUMENTS

| | | |
|---|---|---|
| JP | 2005-260489 A | 9/2005 |
| JP | 2007-184735 | 7/2007 |
| KR | 10-2001-0006805 A | 1/2001 |
| TW | 532039 B | 5/2003 |
| WO | 2007035970 A2 | 3/2007 |

* cited by examiner

PROVIDING AUTHENTICATED COMMUNICATIONS TO A REPLACEABLE PRINTER COMPONENT

CROSS-REFERENCE TO RELATED APPLICATIONS

The present application is currently being filed as a national stage in compliance with 35 U.S.C. 371 and claims the priority under 35 U.S.C. 119(a)-(d) or (f) and under C.F.R. 1.55(a) of previous International Patent Application No.: PCT/US2008/065103, filed May 29, 2008, entitled "Providing Authenticated Communications to a Replaceable Printer Component", which application is incorporated herein by reference in its entirety.

The present application is also related to PCT Patent Application Serial No. PCT/US2008/065104, entitled "AUTHENTICATING A REPLACEABLE PRINTER COMPONENT," filed on May 29, 2008, which is concurrently being filed as a national stage application in compliance with 35 U.S.C. 371, and is incorporated herein by reference.

BACKGROUND

Current printing systems typically include one or more replaceable printer components, such as inkjet cartridges, inkjet printhead assemblies, toner cartridges, ink supplies, etc. Some existing systems provide these replaceable printer components with on-board memory to communicate information to a printer about the replaceable component, such as ink fill level, marketing information, etc.

The data stored in the on-board memory of a replaceable printer component is typically relied upon to properly operate and track the replaceable printer component and the printing system in which the replaceable printer component is installed. As such, the data stored in the on-board memory should not be subjected to unauthorized use or to unauthorized modifications.

For these and other reasons, a need exists for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
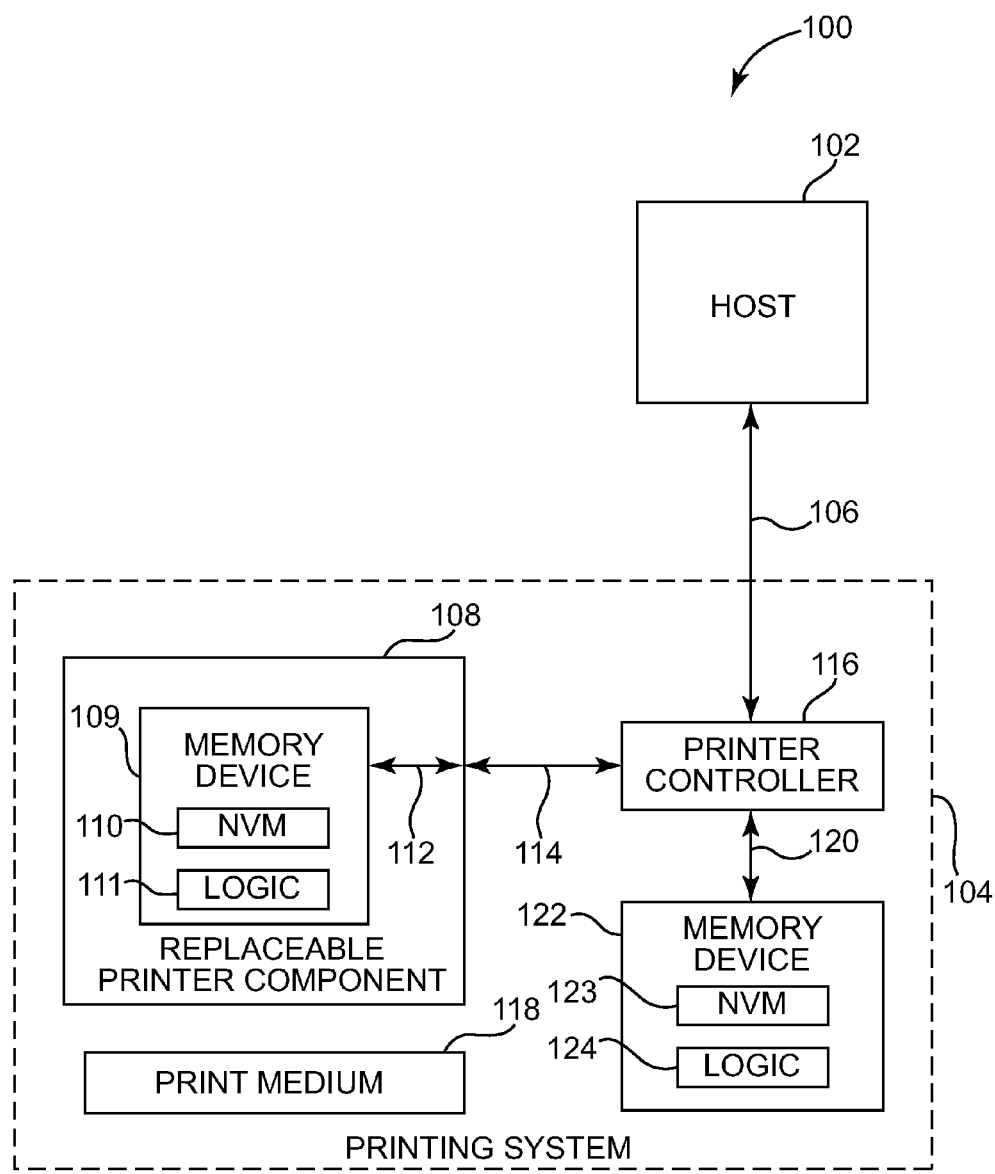
FIG. 1 is a block diagram illustrating one embodiment of a printing arrangement.

FIG. 1 is a block diagram illustrating one embodiment of a printing arrangement 100. Printing arrangement 100 includes a host 102 and a printing system 104. Printing system 104 facilitates printing of graphical and/or textural images on a print medium 118, such as paper, card stock, transparencies, Mylar, cloth, and the like. Printing system 104 includes, for example, an inkjet printer, a laser printer, or other suitable printer. Host 102 communicates with printing system 104 and provides data and/or control signals to printing system 104. Host 102 can be or can be included in a variety of information sources such as a computer, appliance, or other suitable device such as a personal digital assistant (PDA), digital camera, cellular phone, etc.

In one embodiment, printing system 104 includes a printer controller 116, a memory device 122, and a replaceable printer component 108. Replaceable printer component 108 includes a memory device 109. In one embodiment, printer controller 116 authenticates communications between memory device 109 and printer controller 116 based on secret keys stored in memory device 109 and in memory device 122. Thus, unauthorized reading and/or writing of data stored in memory device 109 of replaceable printer component 108 is prevented.

Printer controller 116 controls the operation of printing system 104 and, as such, receives data and/or control signals from host 102. Printer controller 116 communicates with host 102 via a communication link 106. Communication link 106 includes, for example, an electrical, optical, infrared, or other suitable information transfer path between printer controller 116 and host 102. Printer controller 116 communicates with memory device 122 via a communication link 120. Communication link 120 includes, for example, an electrical, optical, infrared, or other suitable information transfer path between printer controller 116 and memory device 122.

Memory device 122 includes a non-volatile memory (NVM) 123 and logic 124. In one embodiment, memory device 122 is tamper proof or tamper resistant. In one embodiment, logic 124 is a logic circuit or embedded software running on a processor. For example, in one embodiment, memory device 122 includes a central processing unit (CPU) or system on a chip (SoC with embedded non-volatile memory 123. In another embodiment, memory device 122 includes a CPU or SoC with external non-volatile memory 123. In another embodiment, memory device 122 includes dedicated logic with internal or external non-volatile memory 123. In another embodiment, memory device 122 is embedded within printer controller 116 with internal or external non-volatile memory 123.

In one embodiment, non-volatile memory 123 is an EEPROM, a FLASH, or another suitable memory. Non-volatile memory 123 stores one or more secret keys used to authenticate communications between printer controller 116 and memory device 109 of replaceable printer component 108. Communications between printer controller 116 and memory device 109 are authenticated by using session-keys. To generate a session-key, printer controller 116 passes a session-key identifier and a request for a session-key to memory device 122. In response to the session-key identifier and the request for a session-key, logic circuit 124 generates a session-key based on the session-key identifier and a secret key stored in non-volatile memory 123. Logic circuit 124 then provides the generated session-key to printer controller 116.

Replaceable printer component 108 includes a component of printing system 104 that is insertable in and removable from printing system 104. In one embodiment, replaceable printer component 108 includes a consumable component that is disposed of and replaced at an end of a useful life thereof. An example of such a consumable component includes an ink container or a toner cartridge that contains a supply of marking material for printing system 104. The marking material is deposited on print medium 118 by printing system 104 and depleted during a useful life of the ink container or toner cartridge. As such, the ink container or toner cartridge is disposed of and replaced at an end of a useful life thereof or is remanufactured and reused.

In another embodiment, replaceable printer component 108 includes a printing component that is readily replaced in printing system 104. Examples of such a printing component include a printhead that selectively deposits ink on print medium 118 in response to control signals from printer controller 116 or a printer cartridge that includes a printhead and an ink supply. Thus, replaceable printer component 108 may include an ink container, a printhead, or a printer cartridge if, for example, printing system 104 includes an inkjet printer. In addition, replaceable printer component 108 may include a toner cartridge or a developer drum if, for example, printing system 104 includes a laser printer. Further, replaceable printer component 108 may include a peripheral device of printing system 104, such as an Ethernet card, a duplexer, a paper finisher (e.g., stapler, hole punch, etc.), or another suitable device.

Printer controller 116 and replaceable printer component 108 communicate with each other via a communication link 114. Communication link 114 facilitates information transfer between printer controller 116 and replaceable printer component 108 when replaceable printer component 108 is installed in printing system 104. Communication link 114 includes, for example, an electrical, optical, infrared, or other suitable information transfer path between replaceable printer component 108 and printer controller 116.

Replaceable printer component 108 includes a memory device 109 that stores information for replaceable printer component 108 and/or printing system 104. Memory device 109 includes a non-volatile memory (NVM) 110 and logic 111. In one embodiment, memory device 109 is tamper proof or tamper resistant. In one embodiment, logic 111 is a logic circuit or embedded software running on a processor. For example, in one embodiment, memory device 109 includes a CPU or SoC with embedded non-volatile memory 110. In another embodiment, memory device 109 includes a CPU or SoC with external non-volatile memory 110. In another embodiment, memory device 109 includes dedicated logic with internal or external non-volatile memory 110.

In one embodiment, non-volatile memory 110 is a 256-byte or another suitably sized non-volatile memory, such as an EEPROM, a FLASH, or another suitable memory. In one embodiment, non-volatile memory 110 of memory device 109 stores, for example, information that is specific to replaceable printer component 108 and/or information that is applicable to printing system 104. In addition, non-volatile memory 110 can have information to be used by printing system 104 stored therein or can record information for printing system 104. In one embodiment, information that may be stored in non-volatile memory 110 includes operational and/or non-operational parameters for replaceable printer component 108 and/or printing system 104.

Non-volatile memory 110 also stores one or more secret keys used to authenticate communications between memory device 109 and printer controller 116. In one embodiment, the one or more secret keys stored in non-volatile memory 110 of memory device 109 are derived from the one or more secret keys stored in non-volatile memory 123 of memory device 122. In other embodiments, the one or more secret keys stored in non-volatile memory 110 of memory device 109 and the one or more secret keys stored in non-volatile memory 123 of memory device 122 are derived from one or more common secret keys. As such, the one or more secret keys stored in non-volatile memory 110 are related to the one or more secret keys stored in non-volatile memory 123.

In one embodiment, replaceable printer component 108 includes a communication link 112 that electrically couples or communicatively couples memory device 109 with communication link 114 and, therefore, with printer controller 116 when replaceable printer component 108 is installed in printing system 104. As such, when replaceable printer component 108 is installed in printing system 104, memory device 109 communicates with printer controller 116 via communication links 112 and 114. Thus, communication links 112 and 114 include, for example, electrical couplings or connections such as electrical contacts or pins that mate with corresponding electrical nodes or receptacles, respectively.

Communications between memory device 109 and printer controller 116 are authenticated by using session-keys. To generate a session-key, printer controller 116 passes a request for a session-key identifier to memory device 109. In response to the request for a session-key identifier, logic circuit 111 of memory device 109 generates a session-key identifier and an associated session-key based on a secret key stored in non-volatile memory 110. In one embodiment, logic circuit 111 of memory device 109 generates a different session-key identifier and an associated session-key in response to each request for a session-key identifier. Therefore, each session-key identifier and each associated session-key is used only once. Logic circuit 111 provides the generated session-key identifier to printer controller 116, which in turn passes the session-key identifier to memory device 122 as previously described above.

Figure 2:
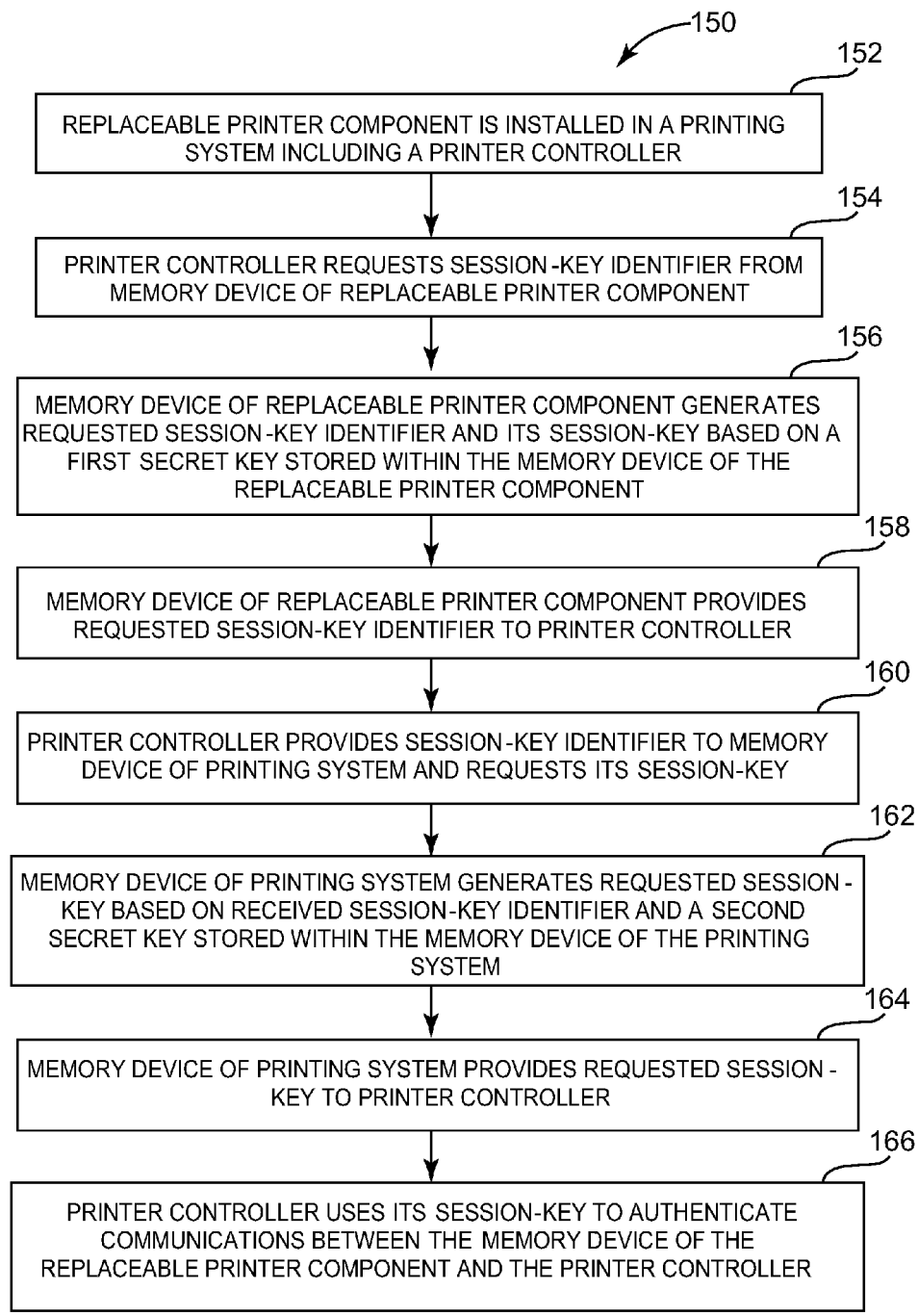
FIG. 2 is a flow diagram illustrating one embodiment of a method for authenticating communications between a replaceable printer component and a printing system.

FIG. 2 is a flow diagram illustrating one embodiment of a method 150 for authenticating communications between a replaceable printer component 108 and a printing system 104. At 152, a replaceable printer component 108 is installed in a printing system 104 including a printer controller 116. The replaceable printer component 108 includes a memory device 109 that has been configured with one or more secret keys for authenticating communications with printing system 104. The printing system 104 also includes a memory device 122 that has been configured with one or more secret keys for authenticating communications with replaceable printer component 108.

At 154, printer controller 116 requests a session-key identifier from memory device 109 of replaceable printer component 108 through communication links 114 and 112. At 156, in response to receiving the request for a session-key identifier, logic circuit 111 of memory device 109 generates the requested session-key identifier and its associated session-key based on a first secret key stored within non-volatile memory 110. At 158, logic circuit 111 of memory device 109 provides the requested session-key identifier to printer controller 116.

At 160, printer controller 116 provides the session-key identifier received from memory device 109 to memory device 122 through communication link 120 and requests a session-key. At 162, in response to receiving the session-key identifier and the request for a session-key, logic circuit 124 of memory device 122 generates the requested session-key based on the received session-key identifier and a second secret key stored in non-volatile memory 123. If the first secret key stored in non-volatile memory 110 of memory device 109 is related to the second secret key stored in non-volatile memory 123 of memory device 122, then the session-key generated by logic circuit 111 matches the session-key generated by logic circuit 124. At 164, logic circuit 124 of memory device 122 provides the requested session-key to printer controller 116. At 166, printer controller 116 uses the received session-key to authenticate communications between printer controller 116 and memory device 109 of replaceable printer component 108.

Figure 3:
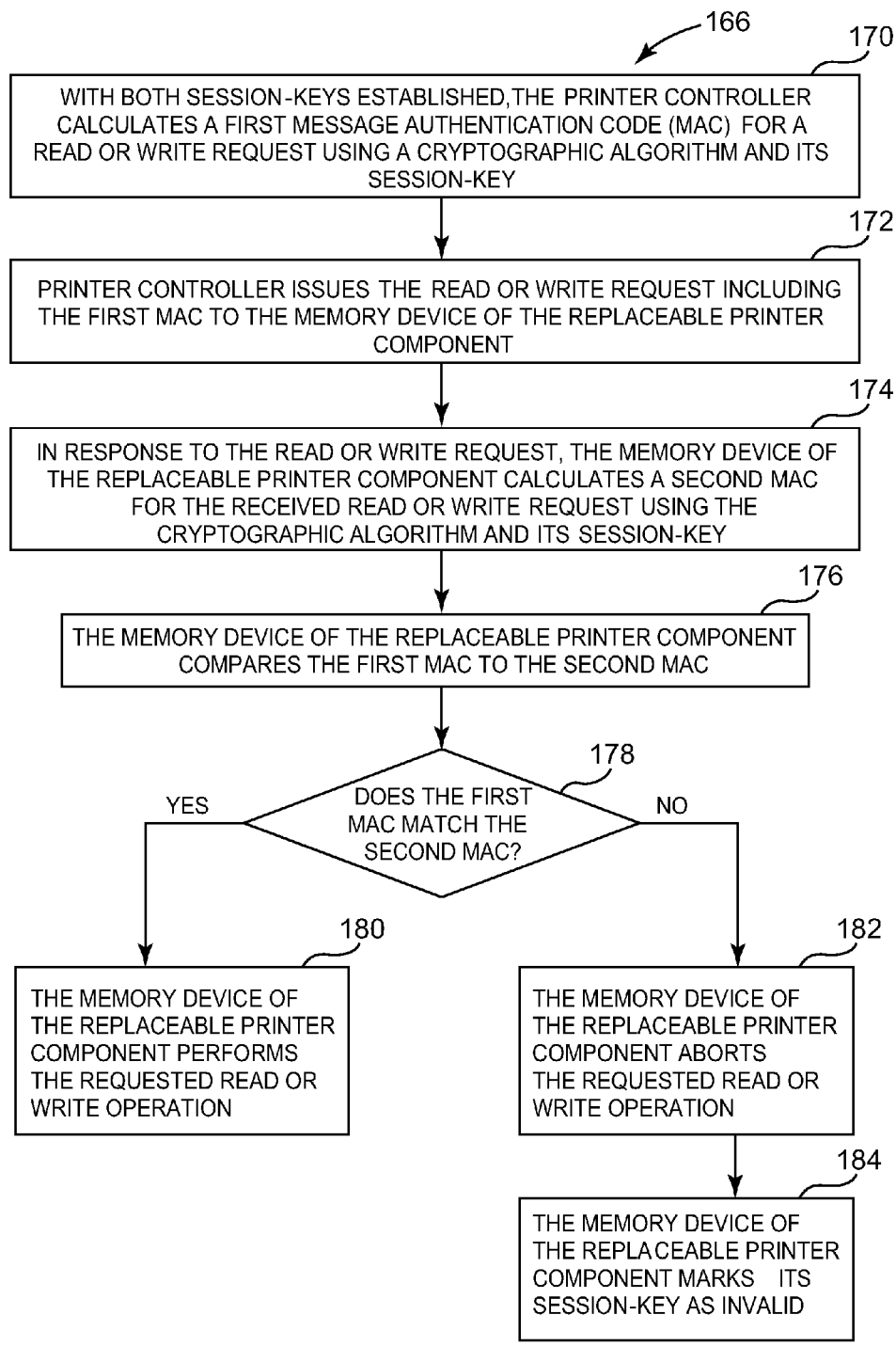
FIG. 3 is a flow diagram illustrating one embodiment of a method for authenticating a read or write request issued by a printing system to a replaceable printer component.

FIG. 3 is a flow diagram illustrating one embodiment of a method 166 for authenticating a read or write request issued by a printing system 104 to a replaceable printer component 108. At 170, with a session-key established in memory device 109 of replaceable printer component 108 and with a session-key established in printing system 104, printer controller 116 calculates a first message authentication code (MAC) for a read or write request using its session-key and a suitable cryptographic algorithm. The first MAC is calculated over the command and command parameters of the read or write request. In one embodiment, a MAC diversifier is used in the calculation of the first MAC to prevent replay attacks against memory device 109.

In one embodiment, the first MAC is calculated based on a hash message authentication code (HMAC) with a secure hash such as secure hash algorithm one (SHA-1), SHA-2, or other suitable secure hash algorithm. In another embodiment, the first MAC is calculated based on a cipher-based MAC (CMAC) with a cipher block algorithm such as data encryption standard (DES), 3DES, advanced encryption standard (AES), Rivest cipher two (RC2), or other suitable cipher block algorithm. In other embodiments, the first MAC is calculated using another suitable technique.

At 172, printer controller 116 issues the read or write request including the first MAC to memory device 109 of replaceable printer component 108. At 174, in response to the read or write request, logic circuit 111 of memory device 109 calculates a second MAC for the received read or write request using its session-key and the cryptographic algorithm. At 176, logic circuit 111 of memory device 109 compares the received first MAC to the calculated second MAC.

At 178, if the first MAC matches the second MAC, then the session-key of memory device 109 matches the session-key of printing system 104. Therefore, the communication between memory device 109 and printer controller 116 is authenticated. At 180, logic circuit 111 of memory device 109 performs the requested read or write operation. Method 170 is repeated for each additional read or write request using the established session-keys until the communication session is ended. The communication session may be ended by printer controller 116 or by a loss of power to printing system 104 and/or replaceable printer component 108.

At 178, if the first MAC does not match the second MAC, then the session-key of memory device 109 does not match the session-key of printing system 104. Therefore, the communication between memory device 109 and printer controller 116 is not authenticated. At 182, logic circuit 111 of memory device 109 aborts or denies the requested read or write operation. At 184, logic circuit 111 of memory device 109 marks its session-key as invalid such that it cannot be used again.

Embodiments provide a printing system into which a replaceable printer component can be installed. Printing system embodiments include a memory device storing one or more secret keys. Replaceable printer component embodiments include a memory device storing one or more secret keys related to the one or more secret keys stored in the memory device of the printing system embodiments. The one or more secret keys stored in the printing system embodiments and in the replaceable printer component embodiments are used to authenticate communications between the printing system embodiments and the replaceable printer component embodiments.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A printing system to receive a replaceable printer component, said printing system comprising:
   a printer controller;
   a first memory device comprising a logic circuit and non-volatile memory and storing a first secret; and
   a communication link configured to communicatively link the replaceable printer component to the printer controller when the replaceable printer component is installed in a printing system, wherein communication between the replaceable printer component and the printer controller occurs in separate sessions, each session having a different established session-key corresponding to that session,
   wherein the printer controller of the printing system is programmed to request a session-key by passing a session-key identifier to the logic circuit of the first memory device, receive a session-key based on the session-key identifier and the first secret from the logic circuit, and exchange message authentication codes with the replaceable printer component to confirm authorized communication.

2. The printing system of claim 1, wherein the first secret is derived from a second secret stored on the replaceable printer component.

3. The printing system of claim 1, wherein the printing system is programmed to receive the session-key identifier from the replaceable printer component.

4. The printing system of claim 3, wherein the printing system is programmed to pass a request for the session-key identifier to from the replaceable printer component.

5. The printing system of claim 1, wherein the printing system is programmed to use the session-key to authenticate communications between the printing system and the replaceable printer component.

6. The printing system of claim 1, wherein the printer controller is programmed to calculate a first message authentication code (MAC) for a read or write request to the replaceable printer component using a cryptographic algorithm and the session-key.

7. The printing system of claim 6, wherein the printer controller is programmed to issue the read or write request to the replaceable printer component, said read or write request including the first MAC.

8. The printing system of claim 7, wherein the replaceable printer component is programmed to calculate a second MAC using the cryptographic algorithm and the session-key, wherein the replaceable printer component will execute the read or write request only if the first and second MACs match.

9. The printing system of claim 8, wherein the replaceable printer component marks the session-key as invalid if the first and second MACs do not match.

10. A method of operating a printing system for receiving a replaceable printer component, the printing system comprising a first memory device storing a first secret, wherein communication between the replaceable printer component and a printer controller of the printing system occurs in separate sessions, each session having a different established session-key corresponding to that session, the method comprising:

with the printer controller of the printing system, requesting, from the replaceable printer component, a component session-key identifier corresponding to a component session-key that is based on a second secret that is associated with the replaceable printer component, wherein said requesting is performed using a communication link configured to communicatively link the replaceable printer component to the printer controller when the replaceable printer component is installed in a printing system; and with the printer controller of the printing system, receiving the requested component session-key identifier from the replaceable printer component;

with the printer controller of the printing system, requesting a session-key by passing the session-key identifier to a logic circuit of the first memory device, with the printer controller of the printing system, receiving a session-key based on the session-key identifier and the first secret from the logic circuit of the first memory device; and using the session-key to authenticate communications between the printing system and the replaceable printer component including exchanging message authentication codes with the replaceable printer component to confirm authorized communication.

11. The method of claim 10, wherein the first secret is derived from the second secret.

12. The method of claim 10, wherein session-key is based on the first secret and the session-key identifier received from the replaceable printer component.

* * * * *

UNITED STATES PATENT AND TRADEMARK OFFICE
CERTIFICATE OF CORRECTION

PATENT NO. : 9,875,365 B2
APPLICATION NO. : 12/994979
DATED : January 23, 2018
INVENTOR(S) : Jacob Grundtvig Refstrup It is certified that error appears in the above-identified patent and that said Letters Patent is hereby corrected as shown below:

In the Claims

In Column 8, Line 27, in Claim 12, delete "wherein session-key" and insert -- wherein the session-key --, therefor.

Signed and Sealed this
First Day of May, 2018

Andrei Iancu
*Director of the United States Patent and Trademark Office*